May 12, 1931.   C. E. RUTHERFORD   1,804,954
ADJUSTABLE ELECTRICAL CONDUIT ELBOW
Filed Oct. 7, 1929
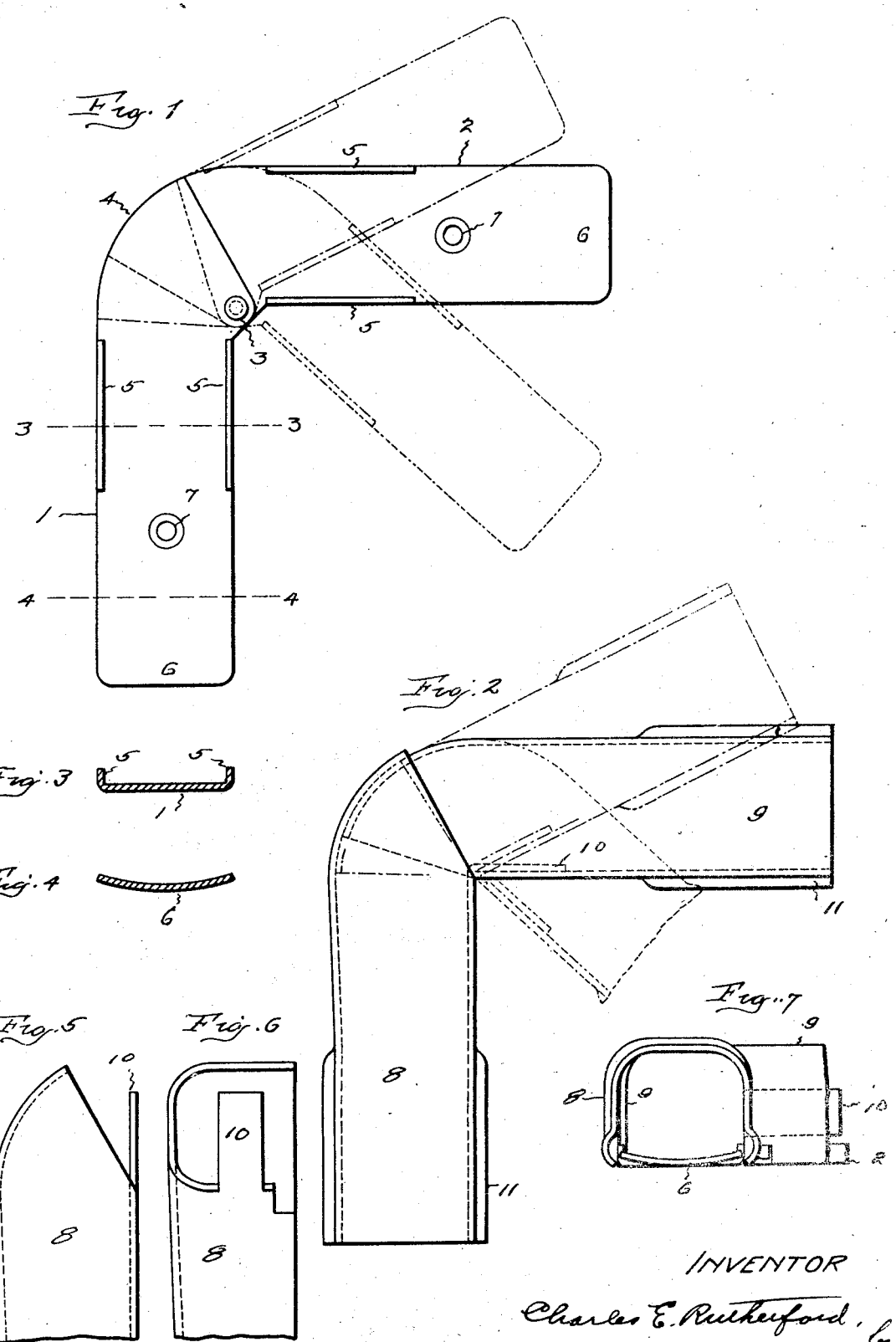

Patented May 12, 1931

1,804,954

UNITED STATES PATENT OFFICE

CHARLES E. RUTHERFORD, OF WEST HARTFORD, CONNECTICUT, ASSIGNOR TO THE WIREMOLD COMPANY, OF HARTFORD, CONNECTICUT, A CORPORATION OF CONNECTICUT

ADJUSTABLE ELECTRICAL CONDUIT ELBOW

Application filed October 7, 1929. Serial No. 397,844.

This invention relates to those elbows that are used in conjunction with conduit which comprises a base strip and a channel-shaped cap for concealing electrically conducting wires.

The object of the invention is to provide a simple and cheap elbow for connecting the ends of the running lengths of conduit at corners and other places where the direction of the run changes, the elbow being angularly adjustable in order that it may be accommodated to the angular relations of the running lengths without exposing the conductors at the ends of the conduit or in the elbow.

To this end the invention resides in an elbow which has a substantially flat base composed of two angularly disposed members that are pivoted together so that they may be attached to a wall or ceiling in the required angular relation, and a channel-shaped cap which is composed of two members that are permanently joined by a connection which is flexible so that the cap members may be bent to the angle necessary to fit the base members and conduit ends to which they are applied after the conduit ends have been connected with the base members and the conductors threaded through.

In the accompanying drawings Fig. 1 is a plan of the base, showing in full lines the members at right angles to each other and showing in dotted lines the relative positions to which they may be adjusted. Fig 2 is a similar view of the channel-shaped cap. Fig. 3 is a section of a base member on the plane indicated by the dotted line 3—3 on Fig. 1. Fig. 4 is a section on the plane indicated by the dotted line 4—4 on Fig. 1. Fig. 5 is a plan of the end of one of the cap members. Fig. 6 is a view looking toward the end of this cap member. Fig. 7 is a view looking toward one end of the elbow with the cap applied to the base.

The base of the elbow shown has a substantially flat member 1 and a substantially flat member 2 that are connected together near one edge by a pivot 3. The joined ends of the base members are overlapped to an extent and the edges opposite the pivot are shaped on arcs, the axes of which are the centers of the pivot holes. Portions of the edges of each base member are bent up to form wings 5 that are designed to fit into and engage the walls of the cap which is applied, and the outer end of each base member is shaped to provide a tongue 6 which is adapted to be engaged with the end of a running length of conduit in the well-known manner of making a slip-joint connection. Holes 7 are made in the base members for the passage of the screws by which the base is fastened in place of use.

The cap is composed of a member 8 and a member 9 which are channel-shaped in cross-section and are designed to fit over and cover the base members. These cap members are permanently joined at one side by a flexible tongue 10 which is preferably formed integral with the side wall of one of the members and is welded, riveted or otherwise fastened to the side wall of the other member. The joined ends of the cap members are curved and so shaped that one will telescope within the other. The outer ends 11 of the cap members are shaped to fit upon the ends of the caps of the running lengths of conduit in the well-known manner.

When put to use the base is fastened in place at the corner, or bend, or locality of change of direction of the conduit, with the members adjusted to the necessary angle with relation to each other to be properly engaged by or slipped into the ends of the running lengths of the conduit which the elbow is designed to connect. The cap is then bent so as to fit the base, the flexible tongue holding the cap members together but permitting them to be bent to the necessary angular relation to each other to fit upon the base and have their outer ends engaged with the ends of the caps of the running sections. The base members of this elbow are always joined together and yet may be adjusted to any desired angular relation, as indicated in Fig. 1, without leaving any opening between them at the joint, that is, the joined ends always overlap to an extent so as to be in metallic contact.

The cap members are also always joined together and they may be bent to various angular relations, as indicated in Fig. 2 without separation or leaving any opening which would expose the wires that pass through the elbow, or without offering any obstruction in the interior of the elbow.

By having the tongue integral with one of the cap sections and mechanically joined with the end of the other cap member, the cap members are not only kept together but there is always an electrical ground connection between them such as is required.

The invention claimed is:

1. A conduit elbow comprising a substantially flat base composed of two members that are pivoted together near one edge and that have their connected ends overlapping, and a channel-shaped cap designed to fit over the base, said cap being composed of two members with the walls on one side permanently joined, and the walls on the other side curved and having a telescopic relation, whereby the base members may be adjusted to a required angular relation, and the cap members may be bent to the same angular relation without disconnection or leaving any opening which would expose conductors in the elbow.

2. A conduit elbow comprising a substantially flat base composed of two members that are pivoted together near one edge and that have their connected ends overlapping, and a channel-shaped cap designed to fit over the base, said cap being composed of two members and a flexible tongue permanently connecting the cap members on one side, the other side being curved and having a telescopic relation, whereby the base members may be adjusted to a required angular relation and the cap members may be bent to the same angular relation without separation.

3. A conduit elbow comprising a substantially flat base composed of two members that are hinged together near one edge and that have their connected ends overlapping, and a channel-shaped cap designed to fit over the base, said cap being composed of two members with the walls on one side permanently joined by a flexible connection.

4. A conduit elbow comprising a substantially flat base composed of two members adjustably connected near one edge and that have their connected ends overlapping, and a channel-shaped cap designed to fit over the base, said cap being composed of two members with a flexible tongue integral with one member and permanently fastened to the other member on one side, and with the other side curved and having a telescopic relation.

CHARLES E. RUTHERFORD.